(12) United States Patent
Hodgkinson et al.

(10) Patent No.: US 11,057,646 B2
(45) Date of Patent: Jul. 6, 2021

(54) IMAGE PROCESSOR AND IMAGE PROCESSING METHOD

(71) Applicant: Panasonic Intellectual Property Corporation of America, Torrance, CA (US)

(72) Inventors: Alec Hodgkinson, Pescadero, CA (US); Luca Rigazio, Campbell, CA (US); Tadamasa Toma, Osaka (JP); Takahiro Nishi, Nara (JP); Kiyofumi Abe, Osaka (JP); Ryuichi Kanoh, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/866,954

(22) Filed: May 5, 2020

(65) Prior Publication Data

US 2020/0267416 A1    Aug. 20, 2020

Related U.S. Application Data

(63) Continuation of application No. PCT/JP2018/040999, filed on Nov. 5, 2018.
(Continued)

(51) Int. Cl.
*H04N 19/86* (2014.01)
*G06T 9/00* (2006.01)

(52) U.S. Cl.
CPC ........... *H04N 19/865* (2014.11); *G06T 9/002* (2013.01)

(58) Field of Classification Search
CPC ............................ H04N 19/865; G06T 9/002
(Continued)

(56) References Cited

U.S. PATENT DOCUMENTS

| 2018/0124422 | A1* | 5/2018 | Van Leuven | .......... H04N 19/31 |
| 2018/0124431 | A1  | 5/2018 | Van Leuven et al. | |
| 2019/0132591 | A1* | 5/2019 | Zhang | .................. H04N 19/136 |

FOREIGN PATENT DOCUMENTS

WO    2017/178827    10/2017

OTHER PUBLICATIONS

International Search Report (ISR) dated Jan. 8, 2019 in International (PCT) Application No. PCT/JP2018/040999.
(Continued)

*Primary Examiner* — Allen C Wong
(74) *Attorney, Agent, or Firm* — Wenderoth, Lind & Ponack, L.L.P.

(57) ABSTRACT

An image processor includes memory and circuitry. The circuitry performs processing of approximating a decompressed image to an original image by using a neural network model trained to approximate the decompressed image to the original image. The decompressed image is obtained as a result of compression of the original image and decompression of the compressed image. The neural network model includes one or more convolutional blocks, and includes one or more residual blocks. Each of the one or more convolutional blocks is a processing block including a convolutional layer. Each of the one or more residual blocks includes a convolutional group including at least one of the one or more convolutional blocks, inputs data which is input to the residual block to the convolutional group included in the residual block, and adds the data input to the residual block to data to be output from the convolutional group.

7 Claims, 12 Drawing Sheets

Related U.S. Application Data

(60) Provisional application No. 62/583,148, filed on Nov. 8, 2017.

(58) Field of Classification Search
USPC .................................................. 375/240.24
See application file for complete search history.

(56) References Cited

OTHER PUBLICATIONS

H.265 (ISO/IEC 23008-2 High Efficiency video coding (HEVC)), Dec. 1, 2013.
Kaiming He, et al., "Deep Residual Learning for Image Recognition", 2016 IEEE Conference on Computer Vision and Pattern Recognition, Jun. 2016, pp. 770-778.
Ping Tai, et al., "Image Super-Resolution via Deep Recursive Residual Network", Computer Vision and Pattern Recognition Workshops, Jul. 2017, pp. 3147-3155.

\* cited by examiner

IMAGE PROCESSOR AND IMAGE PROCESSING METHOD

CROSS REFERENCE TO RELATED APPLICATIONS

This application is a U.S. continuation application of PCT International Patent Application Number PCT/JP2018/040999 filed on Nov. 5, 2018, claiming the benefit of priority of U.S. Provisional Patent Application No. 62/583,148 filed on Nov. 8, 2017, the entire contents of which are hereby incorporated by reference.

BACKGROUND

1. Technical Field

The present disclosure relates to an image processor, etc.

2. Description of the Related Art

There has conventionally been H. 265 called High Efficiency Video Coding (HEVC) as a standard for encoding videos (H. 265 (ISO/IEC 23008-2 HEVC)/HEVC (High Efficiency Video Coding).

SUMMARY

An image processor according to an aspect of the present disclosure includes memory and circuitry accessible to the memory. The circuitry accessible to the memory performs processing of approximating a decompressed image to an original image by using a neural network model trained to approximate the decompressed image to the original image. The decompressed image is obtained as a result of compression of the original image and decompression of the compressed image. The neural network model includes one or more convolutional blocks, and includes one or more residual blocks. Each of the one or more convolutional blocks is a processing block including a convolutional layer. Each of the one or more residual blocks includes a convolutional group including at least one of the one or more convolutional blocks, inputs data which is input to the residual block to the convolutional group included in the residual block, and adds the data input to the residual block to data to be output from the convolutional group.

These general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
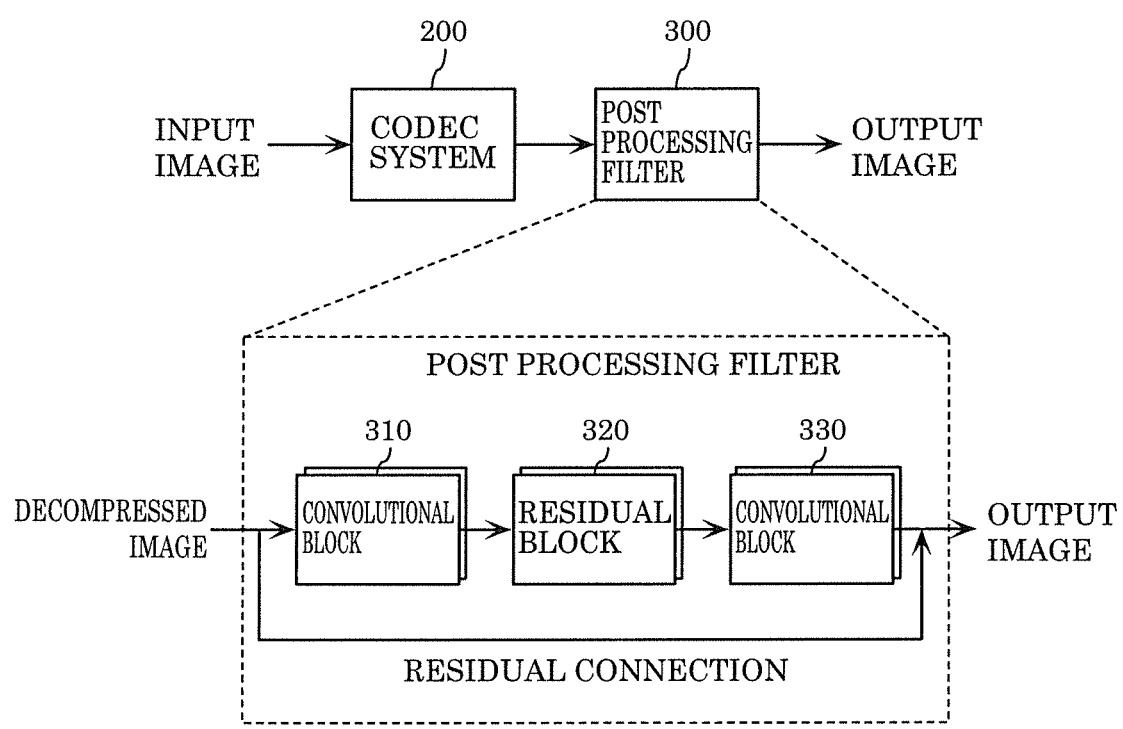
FIG. 1 is a block diagram illustrating a configuration of a post processing filter according to Embodiment 1.

DETAILED DESCRIPTION OF THE EMBODIMENTS (Underlying Knowledge Forming Basis of the Present Disclosure)

It is useful to efficiently store images in storage media. The amount of image data and image quality affect image storage. The amount of image data is reduced by compressing images using a lossy codec. Compressing the images using the lossy codec, however, degrades the quality of the images. For example, artifacts (which may be referred to as compression artifacts) are created in the images. In other words, it is considered that the image quality of a decompressed image which is obtainable by performing compression of an original image and decompression of the compressed image is degraded compared with the image quality of the original image.

In view of this, for example, an image processor according to an aspect of the present disclosure includes memory and circuitry accessible to the memory. The circuitry accessible to the memory performs processing of approximating a decompressed image to an original image by using a neural network model trained to approximate the decompressed image to the original image. The decompressed image is obtained as a result of compression of the original image and decompression of the compressed image. The neural network model includes one or more convolutional blocks, and includes one or more residual blocks. Each of the one or more convolutional blocks is a processing block including a convolutional layer. Each of the one or more residual blocks includes a convolutional group including at least one of the one or more convolutional blocks, inputs data which is input to the residual block to the convolutional group included in the residual block, and adds the data input to the residual block to data to be output from the convolutional group.

In this way, the image processor can appropriately approximate the decompressed image to the original image by using the neural network model suitable for the processing of approximating the decompressed image to the original image.

In addition, for example, the one or more convolutional blocks may be two or more convolutional blocks.

In this way, the image processor can appropriately approximate the decompressed image to the original image by using the neural network model which enables highly accurate training and inference.

For example, the one or more residual blocks may be two or more residual blocks.

In this way, the image processor can appropriately approximate the decompressed image to the original image by using the neural network model which enables further highly accurate training and inference.

In addition, for example, the one or more convolutional blocks may be three or more convolutional blocks. The one or more residual blocks may be included in a residual group, and may include at least one convolutional block among the three or more convolutional blocks. At least one convolutional block which is included in the three or more convolutional blocks and is not included in the residual group may be included in a first convolutional group. At least one convolutional block which is included in the three or more convolutional blocks and is included neither in the residual group nor in the first convolutional group may be included in a second convolutional group. Data which is output from the first convolutional group may be input to the residual group. Data which is output from the residual group may be input to the second convolutional group.

In this way, the image processor can apply further highly accurate computation of abstract features of the image. Accordingly, the image processor is capable of performing efficient processing.

In addition, for example, the neural network model may include a processing group which includes the one or more convolutional blocks and the one or more residual blocks. Data which is input to the neural network model may be input to the processing group, the data which is input to the neural network model may be added to data which is output from the processing group, and a result of the addition may be output from the neural network model.

In this way, the data which is input to the neural network model can be reflected simply on the data which is output from the neural network model. Accordingly, the image processor can appropriately approximate the decompressed image to the original image by using the neural network model which enables efficient training and inference.

In addition, for example, the convolutional group included in each of the one or more residual blocks may include at least two of the two or more convolutional blocks.

In this way, the data which is input to the convolutional group including the at least two convolutional blocks can be reflected simply on the data which is output from the convolutional group. Accordingly, the whole processing in the at least two convolutional blocks can be efficiently performed. Furthermore, amplification of unnecessary errors (noises) is appropriately reduced.

In addition, for example, an image processing method may include: performing processing of approximating a decompressed image to an original image by using a neural network model trained to approximate the decompressed image to the original image. The decompressed image may be obtained as a result of compression of the original image and decompression of the compressed image. The neural network model may include one or more convolutional blocks, and may include one or more residual blocks. Each of the one or more convolutional blocks may be a processing block including a convolutional layer. Each of the one or more residual blocks may include a convolutional group including at least one of the one or more convolutional blocks, input data which is input to the residual block to the convolutional group included in the residual block, and add the data input to the residual block to data to be output from the convolutional group.

In this way, it is possible to appropriately approximate the decompressed image to the original image by using the neural network model suitable for the processing of approximating the decompressed image to the original image.

Furthermore, these general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

Hereinafter, embodiments will be described with reference to the drawings.

It is to be noted that the embodiment and the variations thereof described below each indicates a general or specific example. The numerical values, shapes, materials, constituent elements, the arrangement and connection of the constituent elements, steps, order of the steps, etc., indicated in the following embodiment and variations are mere examples, and therefore are not intended to limit the scope of the claims. Therefore, among the constituent elements in the following embodiments, those not recited in any of the independent claims defining the broadest inventive concepts are described as optional components.

Embodiment 1

First, an outline of Embodiment 1 is explained as one example of an image processor to which the processes and/or configurations which are explained in subsequent descriptions of aspects of the present disclosure are applicable. It is to be noted that Embodiment 1 is merely one example of an image processor to which the processes and/or configurations explained in the descriptions of aspects of the present disclosure are applicable, and thus the processes and/or configurations explained in the descriptions of aspects of the present disclosure can be implemented also in an image processor different from the image processor according to Embodiment 1.

When the processes and/or configurations explained in the descriptions of aspects of the present disclosure are applied to Embodiment 1, for example, any of the following may be performed.

(1) regarding the image processor according to Embodiment 1, among constituent elements included in the image processor, substituting a constituent element corresponding to a constituent element presented in the description of any one of aspects of the present disclosure with a constituent element presented in the description of one of the aspects of the present disclosure;

(2) regarding the image processor according to Embodiment 1, making discretionary changes to functions or implemented processes performed by part of the plurality of constituent elements included in the image processor, such as addition, substitution, or removal, etc., of such functions or implemented processes, and then substituting a constituent element corresponding to a constituent element presented in the description of any one of the aspects of the present disclosure with a constituent element presented in the description of one of the aspects of the present disclosure;

(3) regarding the method which is performed by the image processor according to Embodiment 1, making discretionary changes such as addition of processes and/or substitution, removal of part of the processes included in the method, and then substituting a processes corresponding to a process presented in the description of any one of the aspects of the present disclosure with a process presented in the description of one of the aspects of the present disclosure;

(4) performing a combination of (i) part of constituent elements included in the image processor according to Embodiment 1 and (ii) constituent elements presented in the description of any of the aspects of the present disclosure, constituent elements having one or more functions among functions of constituent elements presented in the description of any one of the aspects of the present disclosure, or constituent elements which perform part of processes performed by constituent elements presented in the description of any one of the aspects of the present disclosure;

(5) performing a combination of (i) a constituent element having part of functions among functions of constituent elements included in the image processor according to Embodiment 1, or a constituent element which performs part of processes performed by constituent elements included in the image processor according to Embodiment 1 and (ii) a constituent element presented in the description of any one of the aspects of the present disclosure, a constituent element having part of functions among functions of a constituent element presented in the description of any one of the aspects of the present disclosure, or a constituent element which performs part of processes performed by a constituent element presented in the description of any one of the aspects of the present disclosure;

(6) regarding the method performed by the image processor according to Embodiment 1, among processes included in the method, substituting a process corresponding to a process presented in the description of any of the aspects of the present disclosure with a process presented in the description of one of aspects of the present disclosure; and (7) performing a combination of (i) part of processes included in the method performed by the image processor according to Embodiment 1 and (ii) a process presented in the description of another one of the aspects of the present disclosure.

It is to be noted that how to perform the processes and/or configurations presented in the descriptions of aspects of the present disclosure is not limited to the above examples. For example, the processes and/or configurations presented in the descriptions of aspects of the present disclosure may be performed in the image processor disclosed in Embodiment 1 or a device used for a purpose different from a purpose of the image processor. Moreover, processes and/or configurations described in different aspects may be performed in combination.

[Outline of Image Processor]

First, an outline of the image processor according to this embodiment will be explained. The image processor performs post processing of a decompressed image in order to reduce artifacts in the decompressed image. The decompressed image is obtained as a result of compression of an original image and decompression of the compressed image.

The image processor may include a decoder. The decoder decodes encoded images. In other words, the decoder performs decompression of a compressed image obtained as a result of compression of the original image, and outputs the decompressed image obtained as a result of the decompression of the compressed image. The image processor may include an encoder. The encoder encodes images. In other words, the encoder performs compression of the original image, and outputs the compressed image obtained as a result of the compression of the original image.

Alternatively, the image processor may be included in the decoder, the encoder, or an encoder and decoder which includes a decoder and an encoder. For example, the image processor may be included in an encoder, and may perform processing for generating prediction images in the encoder. Specifically, in the encoder, a decoded image may be generated by an encoded image being decoded, and a prediction image may be generated by the image processor performing post processing of the decoded image.

In addition, the image processor performs post processing of the decompressed image by using a neural network model. The neural network model is a mathematical model parameterized based on the organizational principles of the human brain. The neural network model may be simply referred to as a neural network. In the subsequent descriptions, for convenience, a case in which the image processor performs processing by using a neural network may be described as a case in which the neural network performs the processing.

In addition, a neural network having a multi-layer structure may be referred to as a deep neural network. For example, the neural network includes an input layer, a middle layer, and an output layer. Data is input to the input layer, passes through the middle layer, and is output from the output layer. The middle layer may be referred to as a hidden layer. The neural network may include a plurality of middle layers. In addition, each of the input layer, one or more middle layers, and the output layer includes a plurality of nodes.

Each node may be referred to as a neuron. For example, data referred to as a weighted input is input to the neuron, and a non-linear activation function is applied thereto, and the result is output. Here, "non-linear" indicates that the activation function is not a linear expression. In addition, the weighted input is obtained by performing weighting of output data from the plurality of nodes in a pre-stage layer using a weighting matrix. A bias may be added to the weighted input.

When the neural network has sufficient performances, the neural network has properties of a universal function approximator. In other words, various patterns can be modelled using the neural network. Based on such properties, the neural network can be used in various kinds of processing including identification, control, and generation. For example, the neural network can be used for transformation of an input distribution to another distribution. In other words, the neural network can be used for transformation of input data to other data.

The image processor according to this embodiment applies a neural network to transformation of a decompressed image to an image closer to an original image. As described above, the decompressed image includes compression artifacts. The original image is a non-compression image and does not include any compression artifact. In other words, by using the neural network, the image processor transforms the decompressed image including compression artifacts to the image closer to the non-compression image that does not include any compression artifact.

More specifically, the decompressed image is input to the neural network, and the decompressed image transformed closer to the original image is output from the neural network.

In addition, for example, the neural network is trained using a gradient descent algorithm called back propagation. Specifically, first, the neural network performs processing in a normal direction (which may be referred to as a forward direction by using training data as input data. The neural network then calculates an error between output data and correct answer data according to a loss function. For example, the mean squared error or L2 loss function is used as the loss function.

$$\mathcal{L} = \frac{1}{n}\sum_{i=1}^{n}(y_i - \hat{y}_i)^2 \quad \text{[Math. 1]}$$

Here, $y_i$ is correct answer data to training data.

$$\hat{y}_i \quad \text{[Math. 2]}$$

In addition, $\hat{y}_i$ is output data from the neural network for the training data.

The neural network performs error propagation in an inverse direction (which may be referred to as a backward direction), and calculates a loss function gradient regarding parameters such as weights. The neural network then updates the parameters using the calculated gradient so that errors are minimized, that is, highly accurate inference is performed.

For example, a decompressed image obtained as a result of compression of an original image and decompression of the compressed image is used as input data corresponding to the training data, and the non-compression original image is used as the correct answer data. The training is performed in a plurality of patterns. More specifically, the training is performed using a plurality of original images and a plurality of decompressed images corresponding respectively to the plurality of original images.

In other words, two image sets are used in training of a generative neural network for post processing in a codec. A first image set includes non-compression images. A second image set includes decompressed images obtained by compression of a non-compression image and decompression of compressed images using a codec conforming to the JPEG or HEVC/H.265.

The images for use in the training may be image thumbnails or partial images extracted from larger-size images in order to reduce the processing amount. For example, the size of each image may be any size in a range from 32×32 pixels to 256×256 pixels.

The second set of decompressed images is input to the neural network. The neural network then performs inference and outputs images corresponding to the non-compression images. For example, one or more layers in the neural network perform feature extraction of the decompressed images. In other words, features of the decompressed images are extracted. The one or more layers in the neural network are trained so that the features corresponding to the structures of the decompressed images are to be extracted. In addition, a deeper layer in the neural network processes more abstract features.

The performances of the neural network depend on the architecture defined in the designing of the neural network. A convolutional neural network (CNN) which is one aspect of the neural network has improved performances in vision-related processing. More specifically, it is conceived that the convolutional neural network is a feed forward network which performs convolutional computation and has performances higher than the performances of any other fully connected network.

For example, the convolutional neural network has a fewer number of weights. In this way, the convolutional neural network which has a large scale and high performances can be trained using only a small amount of processing. In addition, the convolutional neural network is capable of performing processing using features having beneficial spatial invariance in visual processing by using convolutional computation.

More specifically, the convolutional neural network includes a convolutional block which is a processing block including a convolutional layer. The convolutional layer is an aspect of a middle layer in the neural network, and is a processing layer which performs convolutional computation. For example, in image processing, the convolutional block obtains, as an input, 3-dimensional tensor with height, width, and channel dimensions. The convolutional block appropriately applies affine transformation, non-linear transformation, etc., and outputs 3-dimensional tensor which may be different in size and content from the 3-dimensional tensor which has been input.

For example, in the convolutional neural network, a plurality of convolutional blocks is stacked respectively as a plurality of layers. The plurality of convolutional blocks performs complicated processing such as extraction, detection, classification, etc. of the features.

In addition, in the convolutional neural network, an architecture called a residual connection may be applied. The residual connection may be called a skip connection. The residual connection classifies a series of one or more convolutional layers into a group. In other words, the residual connection classifies a series of one or more convolutional blocks into a group. Here, the series of one or more convolutional blocks classified into the group may be referred to as a convolutional group.

The processing block including the one or more convolutional layers classified into the group may be referred to as a residual block. In other words, the residual block includes the one or more convolutional blocks. Furthermore, the residual block includes a convolutional group.

For example, data which is input to the residual block is added to data which is output from the residual block by the residual connection. Specifically, addition processing is performed. In this way, input x of the residual block and output F(x) of the residual block are correlated with each other. The whole residual block is then subjected to training of F(x)–x.

In other words, appropriate training regarding the difference between the input and the output is possible. The training regarding the difference between the input and the output means training of a feature close to 0. The residual connection enables such useful training. In addition, when no residual connection is used, unnecessary errors (noises) may be amplified by information processing in each layer. Use of the residual connection reduces such unnecessary error amplification. In addition, residual coupling reduces loss in a loss function gradient in back propagation.

Furthermore, a Generative Adversarial Network (GAN) may be applied as a neural network. The Generative Adversarial Network includes two sub-neural networks.

A first sub-neural network is referred to as a generator. The generator is responsible for generating data that resembles real data. A second sub-neural network is referred to as a discriminator. This discriminator may be referred to as an adversary or a critic. The discriminator is responsible for discriminating real and fake inputs.

For example, the two sub-neural networks are trained jointly based on the minimax method and a zero sum game. The following function may be used as an evaluation function in this case.

$$\mathcal{L} = \mathbb{E}_{x \sim P(x)}[\log D(x)] + \mathbb{E}_{z \sim P(z)}[\log(1 - D(G(z)))] \quad \text{[Math. 3]}$$

Here, D(x) represents the discriminator, G(z) represents the generator, P(x) represents an input distribution, and P(z) represents an output distribution. In addition, the first term of the right side (that is, the left term at the right side) corresponds to an expected value of the discriminator identifying the real data as a real one. The second term of the right side (that is, the right term at the right side) corresponds to an expected value of the discriminator identifying the fake data as a fake. The discriminator and generator may be derived by means of D which maximizes such an evaluation function being derived and G which minimizes the evaluation function maximized by derived D being derived.

The image processor according to this embodiment may use the above-described Generative Adversarial Network as a neural network. More specifically, the following may be used: a generator which is a sub-neural network that generates an image closer to an original image, from a decompressed image; and a discriminator which is a sub-neural network that discriminates the original image and an image generated from the decompressed image.

In addition, the image processor according to this embodiment may compress dimensions of image-related information, and may use, as a neural network, the architecture of an auto encoder, or the like which restores the compressed dimensions.

[Specific Example of Image Processor]

FIG. 1 is a block diagram illustrating a configuration of a post processing filter included in an image processor in this embodiment.

For example, codec system 200 applies a codec to an input image which is an original image. In other words, codec system 200 performs compression of an input image and decompression of the compressed image. Codec system 200 then outputs the decompressed image obtained as a result of the compression of the input image and decompression of the compressed image. Codec system 200 may use an H.265/HEVC architecture, or a JPEG architecture.

Alternatively, codec system 200 may use an architecture based on a machine learning such as a neural network. For example, codec system 200 may use an architecture of an auto encoder.

Basically, a decompressed image is degraded from an input image by a lossy codec in codec system 200.

Post processing filter 300 then performs image processing for approximating the decompressed image to the input image. Post processing filter 300 then outputs the decompressed image subjected to the image processing as an output image.

More specifically, post processing filter 300 has a neural network subjected to training for approximating the decompressed image to the original image. Post processing filter 300 then performs image processing for approximating the decompressed image to the original image by using the neural network. In addition, the neural network of post processing filter 300 includes one or more convolutional blocks. In addition, the neural network includes one or more residual blocks.

In the example of FIG. 1, the neural network includes one or more convolutional blocks 310, includes one or more residual blocks 320 after one or more convolutional blocks 310, and includes one or more convolutional blocks 330 after one or more residual blocks 320. In addition, data which is input to the neural network is added to data which is output from the neural network.

In other words, the result obtained from the data which is input to the neural network through one or more convolutional blocks 310, one or more residual blocks 320, and one or more convolutional blocks 330 is added to data which is input to the neural network. The addition result is then output as an output image from the neural network.

It is to be noted that configurations of neural networks are not limited to the configuration of the neural network illustrated in FIG. 1. One or more convolutional blocks and one or more residual blocks may be configured in any way. For example, each of all the convolutional blocks may be included in any of the one or more residual blocks. In addition, for example, a convolutional block which is not included in any of a plurality of residual blocks may be present between two of the residual blocks. In addition, a residual connection which connects an input of a neural network to an output of the neural network does not always need to be present.

In addition, a group including one or more convolutional blocks and one or more residual blocks included in a neural network model may be represented as a processing group. In the example of FIG. 1, one or more convolutional blocks 310, one or more residual blocks 320, and one or more convolutional blocks 330 are included in a processing group.

Figure 2:
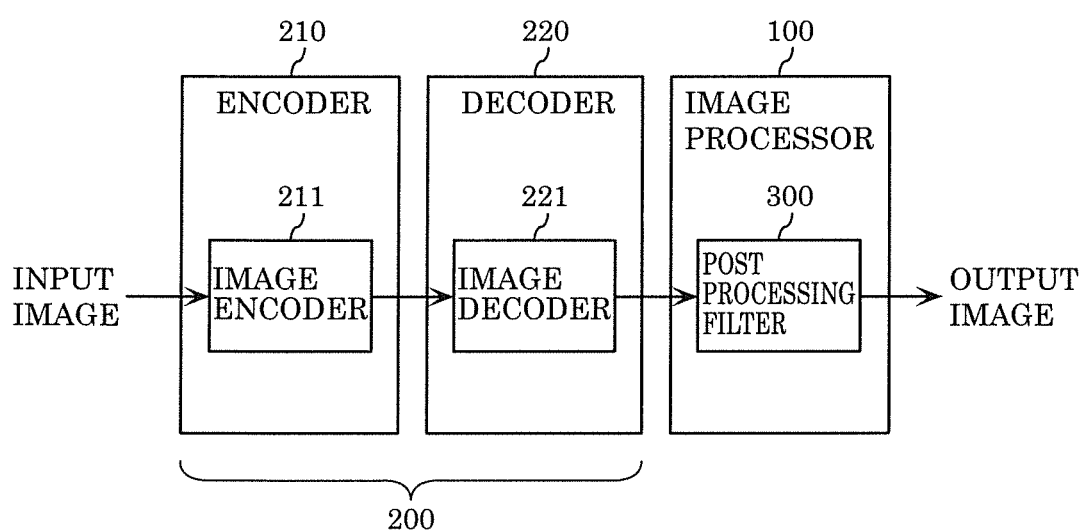
FIG. 2 is a block diagram illustrating a configuration of a codec system according to Embodiment 1.

FIG. 2 is a block diagram illustrating a configuration of codec system 200 illustrated in FIG. 1. For example, codec system 200 includes encoder 210 and decoder 220. In addition, post processing filter 300 is included in image processor 100.

Encoder 210 includes image encoder 211. Image encoder 211 performs compression of an input image by encoding the input image, and outputs a compressed image obtained as a result of the compression of the input image as an encoded image.

Decoder 220 includes image decoder 221. Image decoder 221 performs decompression of a compressed image by decoding the encoded image, and outputs a decompressed image obtained as a result of the decompression of the compressed image.

Post processing filter 300 then performs image processing of the decompressed image in order to approximate the decompressed image to the input image. Post processing filter 300 then outputs the decompressed image subjected to the image processing as an output image.

Image processor 100 may include either decoder 220 or image decoder 221. Image processor 100 may further include either encoder 210 or image encoder 211.

Figure 3:
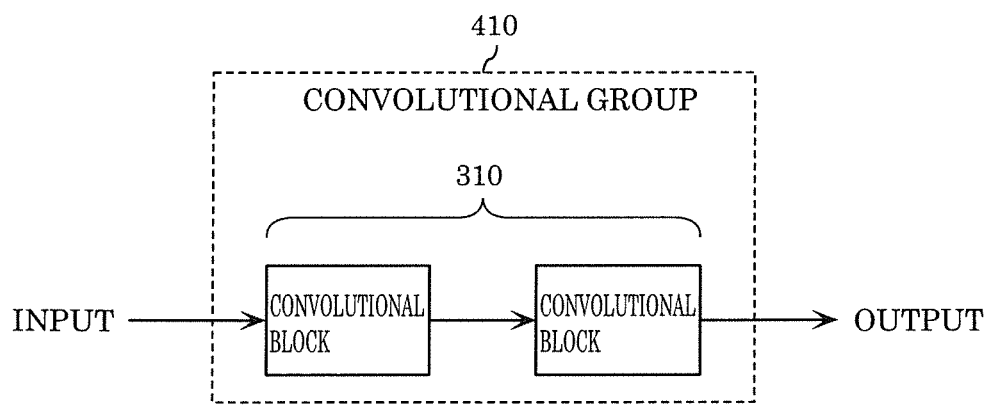
FIG. 3 is a block diagram illustrating a connection configuration of a plurality of convolutional blocks according to Embodiment 1.

FIG. 3 is a block diagram illustrating a connection configuration of one or more convolutional blocks 310 illustrated in FIG. 1. One or more convolutional blocks 310 are included in convolutional group 410. FIG. 3 illustrates two convolutional blocks 310 in convolutional group 410.

In the example of FIG. 3, two convolutional blocks 310 are connected in series. In other words, data which is input to convolutional group 410 is input to one convolutional block 310 (that is, convolutional block 310 on the left in FIG. 3). Data which is output from one convolutional block 310 is then input to the other convolutional block 310 (that is, convolutional block 310 on the right in FIG. 3). Data which is output from convolutional block 310 on the right is output from convolutional group 410.

Although two convolutional blocks 310 are connected in series here, three or more convolutional blocks 310 may be connected in series. In addition, a plurality of convolutional blocks 310 may be connected in parallel. For example, three convolutional blocks 310 corresponding to red, green, and blue may be connected in parallel. In addition, only one convolutional block 310 may be used instead of the plurality of convolutional blocks 310.

In addition, although a connection configuration of one or more convolutional blocks 330 is illustrated here, the connection configuration of one or more convolutional blocks 310 is similar to the connection configuration of the one or more convolutional blocks 310.

Figure 4:
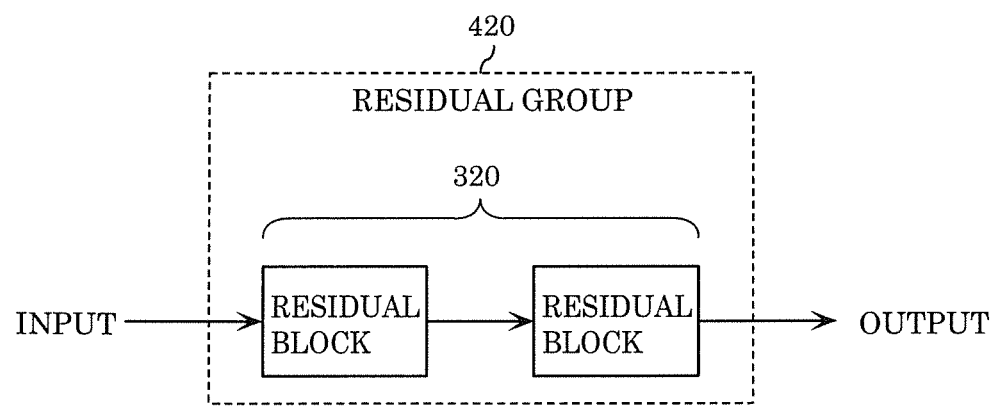
FIG. 4 is a block diagram illustrating a connection configuration of a plurality of residual blocks according to Embodiment 1.

FIG. 4 is a block diagram illustrating a connection configuration of one or more residual blocks 320 illustrated in FIG. 1. One or more residual blocks 320 are included in residual group 420. FIG. 4 illustrates two residual blocks 320 in residual group 420.

In the example of FIG. 4, two residual blocks 320 are connected in series. In other words, data which is input to residual group 420 is input to one residual block 320 (that is, residual block 320 on the left in FIG. 4). Data which is output from one residual block 320 is then input to other residual block 320 (that is, residual block 320 on the right in FIG. 4). Data which is output from residual block 320 on the right is output from residual group 420.

Although two residual blocks 320 are connected in series here, three or more residual blocks 320 may be connected in series. In addition, a plurality of residual blocks 320 may be connected in parallel. For example, three residual blocks 320 corresponding to red, green, and blue may be connected in parallel. In addition, only one residual block 320 may be used instead of the plurality of residual blocks 320.

Figure 5:
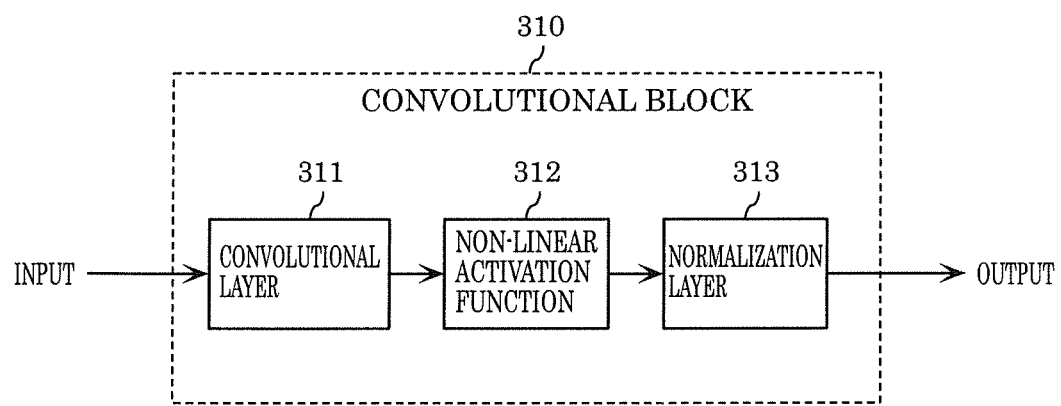
FIG. 5 is a block diagram illustrating a configuration of a convolutional block according to Embodiment 1.

FIG. 5 is a block diagram illustrating a configuration of convolutional block 310 illustrated in FIG. 1. Although FIG. 5 illustrates the configuration of one convolutional block 310, a configuration of another convolutional block 310 is similar thereto. In addition, each of one or more convolutional blocks 330 is configured similarly.

In the example of FIG. 5, convolutional block 310 includes convolutional layer 311, non-linear activation function 312, and normalization layer 313. In this example, data which is input to convolutional block 310 is output from convolutional block 310 through convolutional layer 311, non-linear activation function 312, and normalization layer 313.

Convolutional layer 311 is a processing layer which performs convolutional computation of the data input to convolutional block 310 and outputs the result of the convolutional computation. Non-linear activation function 312 is a function which outputs a computation result using, as an argument, data which is output from convolutional layer 311. For example, non-linear activation function 312 controls output thereof according to a bias. Normalization layer 313 normalizes data which is output from non-linear activation function 312 in order to reduce data deviation, and outputs normalized data.

Figure 6:
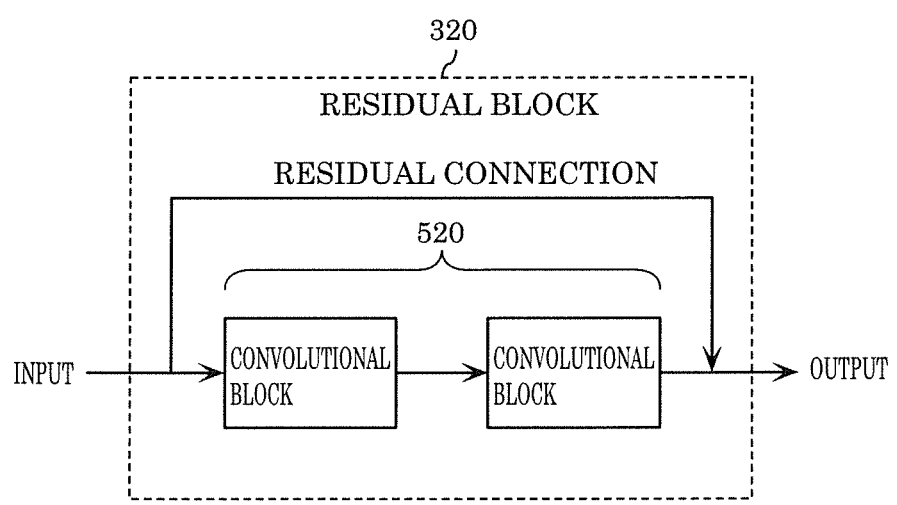
FIG. 6 is a block diagram illustrating a configuration of a residual block according to Embodiment 1.

FIG. 6 is a block diagram illustrating a configuration of residual block 320 illustrated in FIG. 1. Although FIG. 6 illustrates the configuration of one residual block 320, a configuration of another residual block 320 is similar thereto.

In the example of FIG. 6, residual block 320 includes two convolutional blocks 520 connected in series. For example, data which is input to residual block 320 is input to one convolutional block 520 (that is, convolutional block 520 on the left in FIG. 6). Data which is output from one convolutional block 520 is then input to the other convolutional block 520 (that is, convolutional block 520 on the right in FIG. 6).

In addition, data which is input to residual block 320 is added to data which is output from convolutional block 520 on the right, and the addition result is output from residual block 320. In other words, a sum of data which is input to residual block 320 and data which is output from convolutional block 520 on the right is output from residual block 320.

Although two convolutional blocks 520 are connected in series here, three or more convolutional blocks 520 may be connected in series. In addition, only one convolutional block 520 may be used instead of the plurality of convolutional blocks 520.

Image processor 100 according to this embodiment performs image processing of a decompressed image in order to approximate the decompressed image to an original image by using a neural network including a convolutional block and including a residual block. In other words, image processor 100 according to this embodiment performs image processing of the decompressed image in order to approximate the decompressed image to the original image by using the convolutional neural network including a residual connection.

The convolutional computation in the convolutional neural network is useful for image processing because the convolutional computation enables appropriate extraction of image features based on spatial correlations between images. In addition, the above-described residual connection enables appropriate training based on the difference between input information and output information, thus enables appropriate reflection of the input information onto the output information.

In addition, the decompressed image is the image obtainable by the compression of an original image and decompression of the compressed image. Therefore, the original image to be used as teaching data in the training for approximating the decompressed image to the original image can be prepared easily.

Accordingly, in the image processing for approximating the decompressed image to the original image, it is useful to apply the convolutional neural network including the residual connection. Since image processor 100 performs image processing for approximating the decompressed image to the original image by using the convolutional neural network including the residual connection, image processor 100 is capable of reducing compression artifacts in the decompressed image and appropriately enhancing the visual image quality of the decompressed image.

Although the example of the convolutional neural network including the residual connection has been indicated, it is to be noted that another architecture may be applied to a neural network.

For example, a feedback structure may be applied. Such examples include a recurrent neural network or a recursive neural network. More specifically, outputs from one or more convolutional blocks may be used as inputs of the one or more convolutional blocks. In addition, an inverse residual connection may be used.

Figure 7:
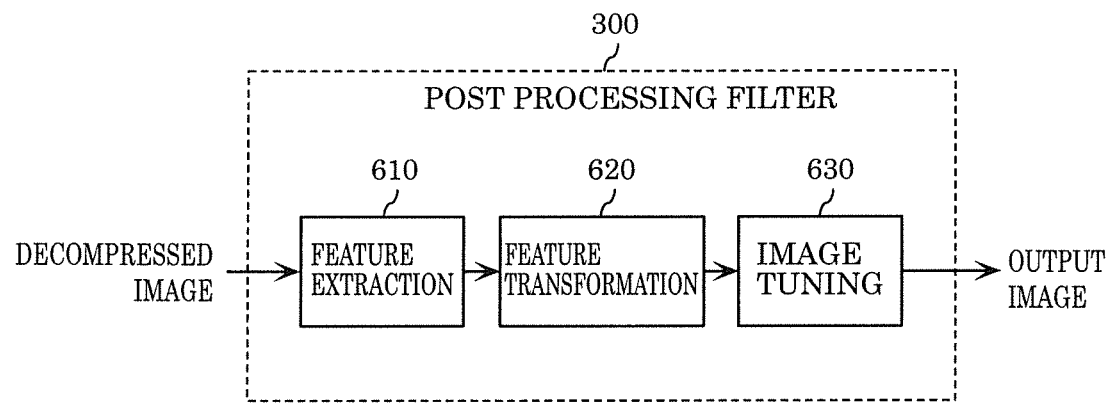
FIG. 7 is a block diagram illustrating functional elements of the post processing filter according to Embodiment 1.

FIG. 7 is a block diagram illustrating functional elements of post processing filter 300 illustrated in FIG. 1. Post processing filter 300 includes feature extraction 610, feature transformation 620, and feature tuning 630 as the functional elements.

More specifically, post processing filter 300 extracts features from a decompressed image in feature extraction 610.

For example, these features can be represented as a combination of a plurality of feature vectors.

In addition, post processing filter 300 transforms the extracted features in feature transformation 620. For example, post processing filter 300 transforms the plurality of feature vectors extracted from the decompressed image into a plurality of feature vectors roughly approximated to a plurality of feature vectors corresponding to the original image.

Post processing filter 300 then performs tuning of the transformed features in feature tuning 630. For example, post processing filter 300 performs tuning of the plurality of transformed feature vectors so that the image quality of the resulting image exceeds the image quality of the decompressed image. In this way, post processing filter 300 performs tuning of the image, and outputs the tuned image as an output image.

[Mounting Example of Image Processor]

Figure 8:
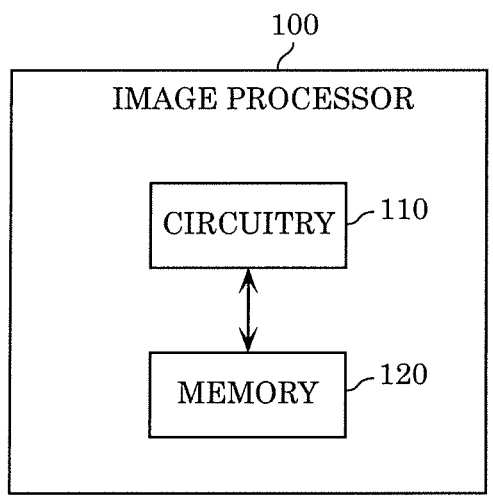
FIG. 8 is a block diagram illustrating a mounting example of an image processor according to Embodiment 1.

FIG. 8 is a block diagram illustrating a mounting example of image processor 100. Image processor 100 includes circuitry 110 and memory 120. For example, the constituent elements which can be included in image processor 100 illustrated in FIG. 2 are mounted on circuit 110 and memory 120 illustrated in FIG. 8.

Circuitry 110 is electronic circuitry accessible to memory 120, and performs image processing. For example, circuitry 110 is a dedicated or general electronic circuitry which processes images using memory 120. Circuitry 110 may be a processor such as a CPU. Alternatively, circuitry 110 may be a combination of a plurality of electronic circuits.

Memory 120 is dedicated or general memory in which information for image processing by circuitry 110 is stored. Memory 120 may be electronic circuitry, may be connected to circuitry 110, or may be included in circuitry 110.

In addition, memory 120 may be a combination of a plurality of electronic circuits, or may include a plurality of sub-memories In addition, memory 120 may be a magnetic disc, an optical disc, or the like, or may be represented as storage, a recording medium, or the like. Alternatively, memory 120 may be non-volatile memory, or volatile memory.

In addition, memory 120 may store in advance decompressed images before being subjected to image processing or decompressed images after being subjected to image processing. In addition, memory 120 may store a program which is used by circuitry 110 to perform processing of decompressed images. In addition, memory 120 may store in advance a neural network model. For example, memory 120 may store in advance a plurality of parameters of a neural network model.

Figure 9:
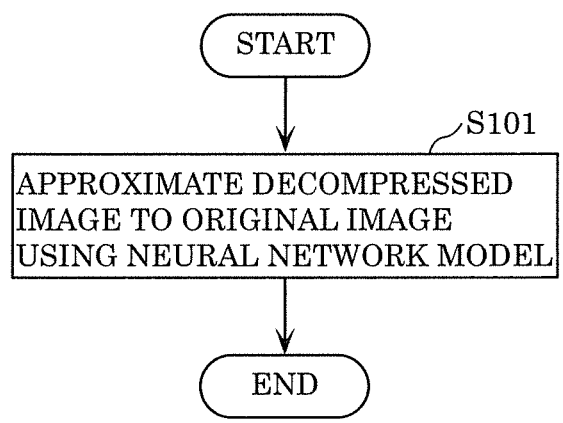
FIG. 9 is a flow chart indicating an operational example of the image processor according to Embodiment 1.

FIG. 9 is a flow chart indicating an operation example of image processor 100 illustrated in FIG. 8. For example, image processor 100 illustrated in FIG. 8 performs an operation illustrated in FIG. 9. More specifically, circuitry 110 in image processor 100 performs the following operation using memory 120.

First, circuitry 110 performs processing of approximating a decompressed image obtained as a result of compression of an original image and decompression of the compressed image to the original image by using a neural network model subjected to training for approximating the decompressed image to the original image (S101). Here, the neural network model includes one or more convolutional blocks, and includes one or more residual blocks.

Each of the one or more convolutional blocks is a processing block including a convolutional layer. Each of the one or more residual blocks is a processing block that includes a convolutional group including at least one of the one or more convolutional blocks. Each of the one or more residual blocks inputs data which is input to the residual block into the convolutional group included in the residual block, and adds the data which is input to the residual block to data which is output from the convolutional block.

In this way, image processor 100 can appropriately approximate the decompressed image to the original image by using the neural network model suitable for the processing of approximating the decompressed image to the original image.

For example, the one or more convolutional blocks may be two or more convolutional blocks. In this way, image processor 100 can appropriately approximate the decompressed image to the original image by using the neural network model which enables highly accurate training and inference.

For example, the one or more residual blocks may be two or more residual blocks. In this way, image processor 100 can appropriately approximate the decompressed image to the original image by using the neural network model which enables further highly accurate training and inference.

For example, the one or more convolutional blocks may be three or more convolutional blocks.

The one or more residual blocks may be included in a residual group, and may include at least one convolutional block among the three or more convolutional blocks. At least one convolutional block which is included in the three or more convolutional blocks and is not included in the residual group may be included in a first convolutional group. At least one convolutional block which is included in the three or more convolutional blocks and is included neither in the residual group nor in the first convolutional group may be included in a second convolutional group.

Data which is output from the first convolutional group may be input to the residual group. Data which is output from the residual group may be input to the second convolutional group.

In this way, image processor 100 can apply further highly accurate computation of the abstract features of the image. Accordingly, image processor 100 is capable of performing efficient processing.

For example, the neural network model may include a processing group which includes the one or more convolutional blocks and the one or more residual blocks. Data which is input to the neural network model may be input to the processing group, the data which is input to the neural network model may be added to data which is output from the processing group, and a result of the addition may be output from the neural network model.

In this way, the data which is input to the neural network model can be reflected simply on the data which is output from the neural network model. Accordingly, image processor 100 can appropriately approximate the decompressed image to the original image by using the neural network model which enables efficient training and inference.

For example, the convolutional group included in each of the one or more residual blocks may include at least two of the two or more convolutional blocks.

In this way, the data which is input to the convolutional group including the at least two convolutional blocks can be reflected simply on the data which is output from the convolutional group. Accordingly, the whole processing in the at least two convolutional blocks can be efficiently performed. Furthermore, amplification of unnecessary errors (noises) is appropriately reduced.

Alternatively, training for approximating a decompressed image to an original image may be performed using a plurality of other original images and a plurality of other decompressed images corresponding respectively to the plurality of the other original images. More specifically, when the decompressed images corresponding to the original images are input to the neural network, parameters for the neural network may be updated so that images obtained by approximating the decompressed images to the original images are output from the neural network. In this way, tuning of the parameters for the neural network can be performed.

[Supplements]

Image processor 100 according to this embodiment may be used as an encoder including a constituent element for encoding images, or may be used as a decoder including a constituent element for decoding images. Alternatively, image processor 100 may be used as an encoder and decoder including a constituent element for encoding images and a constituent element for decoding images.

Alternatively, image processor 100 may be used as a video processor, a video encoder, a video decoder, or a video encoder and decoder either of which processes each of images of a video. In addition, image processor 100 may be used as a filter device.

Furthermore, at least part of this embodiment may be used as an image processing method, as a decoding method, as a filtering method, or another method.

The processing group, the convolutional group, and the residual group can be represented as a processing block set, a convolutional block set, and a residual block set, respectively.

In addition, in each of the embodiments, each of the constituent elements may be configured with dedicated hardware, or may be implemented by executing a software program suitable for each constituent element. Each constituent element may be implemented by means of a program executor that is a CPU, a processor, or the like reading and executing a software program stored in a recording medium that is a hard disc, a semiconductor memory, or the like.

Specifically, image processor 100 may include processing circuitry and storage electrically connected to the processing circuitry and accessible from the processing circuitry. For example, the processing circuitry corresponds to circuitry 110, and the storage corresponds to memory 120.

The processing circuitry includes at least one of the dedicated hardware and the program executor, and executes the process using the storage. In addition, when the processing circuitry includes the program executor, the storage stores a software program that is executed by the program executor.

Here, the software which implements image processor 100, etc. according to this embodiment is a program as indicated below.

In addition, for example, the program may cause a computer to execute an image processing method which includes: performing processing of approximating a decompressed image to an original image by using a neural network model trained to approximate the decompressed image to the original image. The decompressed image may be obtained as a result of compression of the original image and decompression of the compressed image. The neural network model may include one or more convolutional blocks, and may include one or more residual blocks. Each of the one or more convolutional blocks may be a processing block including a convolutional layer. Each of the one or more residual blocks may include a convolutional group including at least one of the one or more convolutional blocks, input data which is input to the residual block to the convolutional group included in the residual block, and add the data input to the residual block to data to be output from the convolutional group.

In addition, each constituent element may be circuitry as described above. Circuits may compose circuitry as a whole, or may be separate circuits. Alternatively, each constituent element may be implemented as a general processor, or may be implemented as a dedicated processor.

In addition, the process that is executed by a particular constituent element may be executed by another constituent element. In addition, the processing execution order may be modified, or a plurality of processes may be executed in parallel. In addition, the ordinal numbers such as "first" and "second" may be arbitrarily added to constituent elements, etc.

Although some aspects of image processor 100 have been explained based on the above embodiment, aspects of image processor 100 are not limited to the embodiment. The scope of the aspects of image processor 100 may encompass embodiments obtainable by adding, to any of these embodiments, various kinds of modifications that a person skilled in the art would arrive at without deviating from the scope of the present disclosure and embodiments configurable by arbitrarily combining constituent elements in different embodiments.

This aspect may be implemented in combination with one or more of the other aspects according to the present disclosure. In addition, part of the processes or part of the constituent elements according to this aspect may be implemented in combination with other aspects.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

Figure 10:
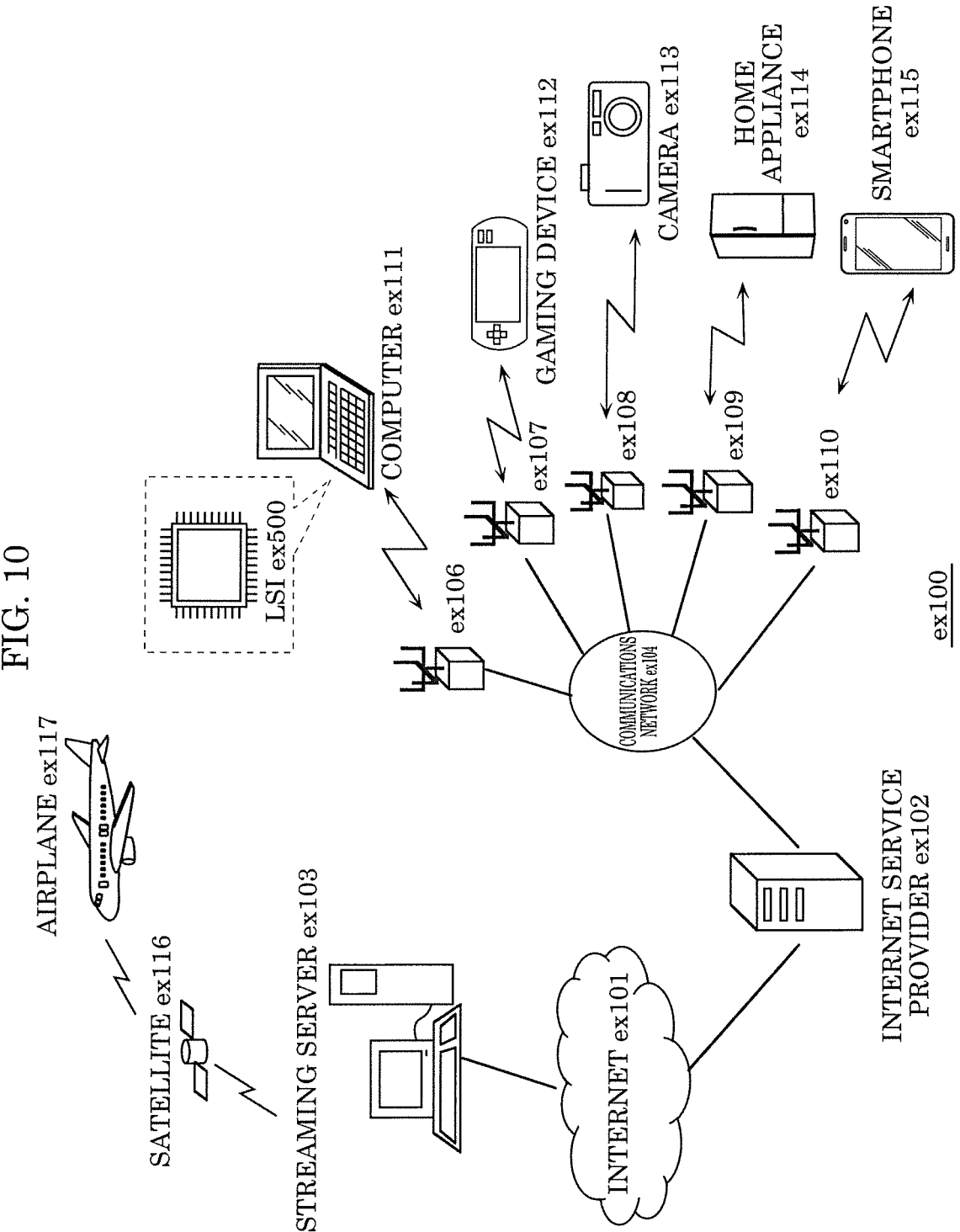
FIG. 10 illustrates an overall configuration of a content providing system for implementing a content distribution service.

FIG. 10 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the α value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 11:
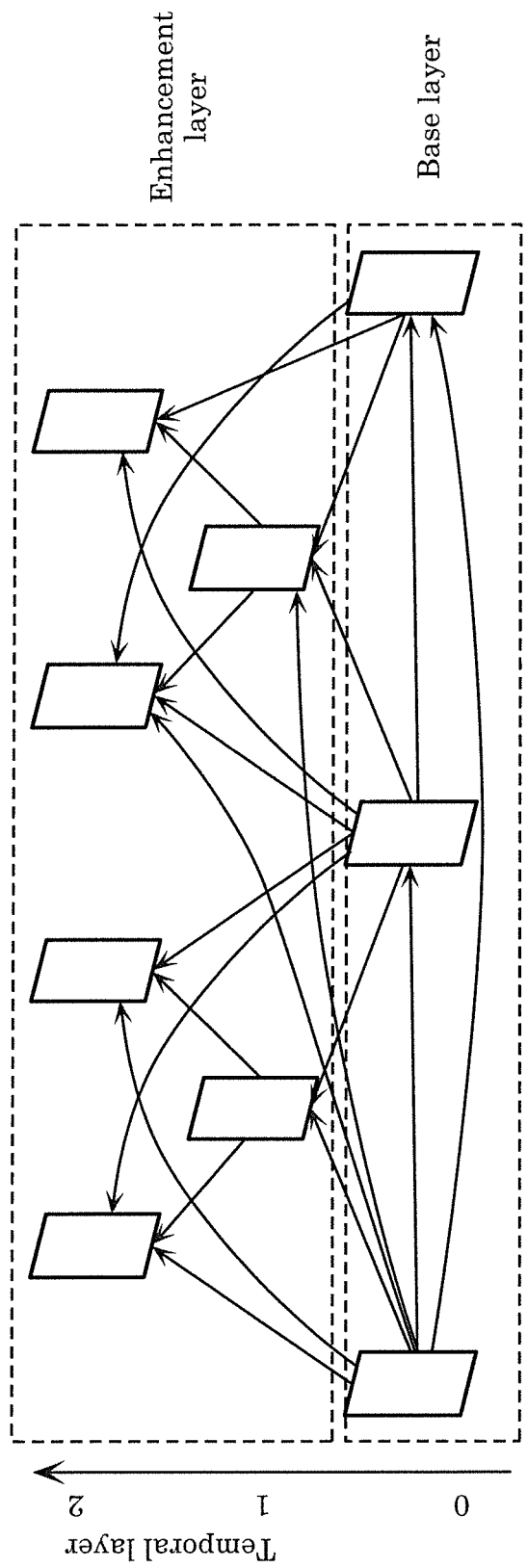
FIG. 11 illustrates one example of an encoding structure in scalable encoding.

The switching of content will be described with reference to a scalable stream, illustrated in FIG. 11, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 11. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 12:
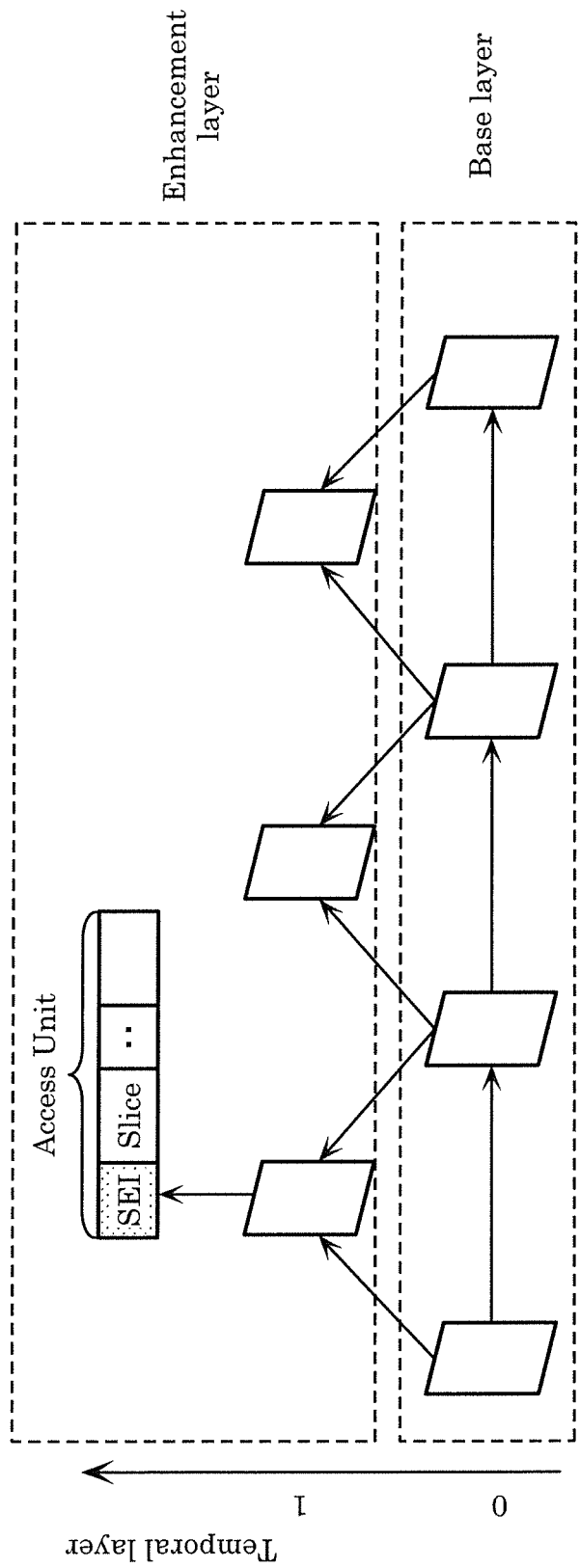
FIG. 12 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 12, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 13:
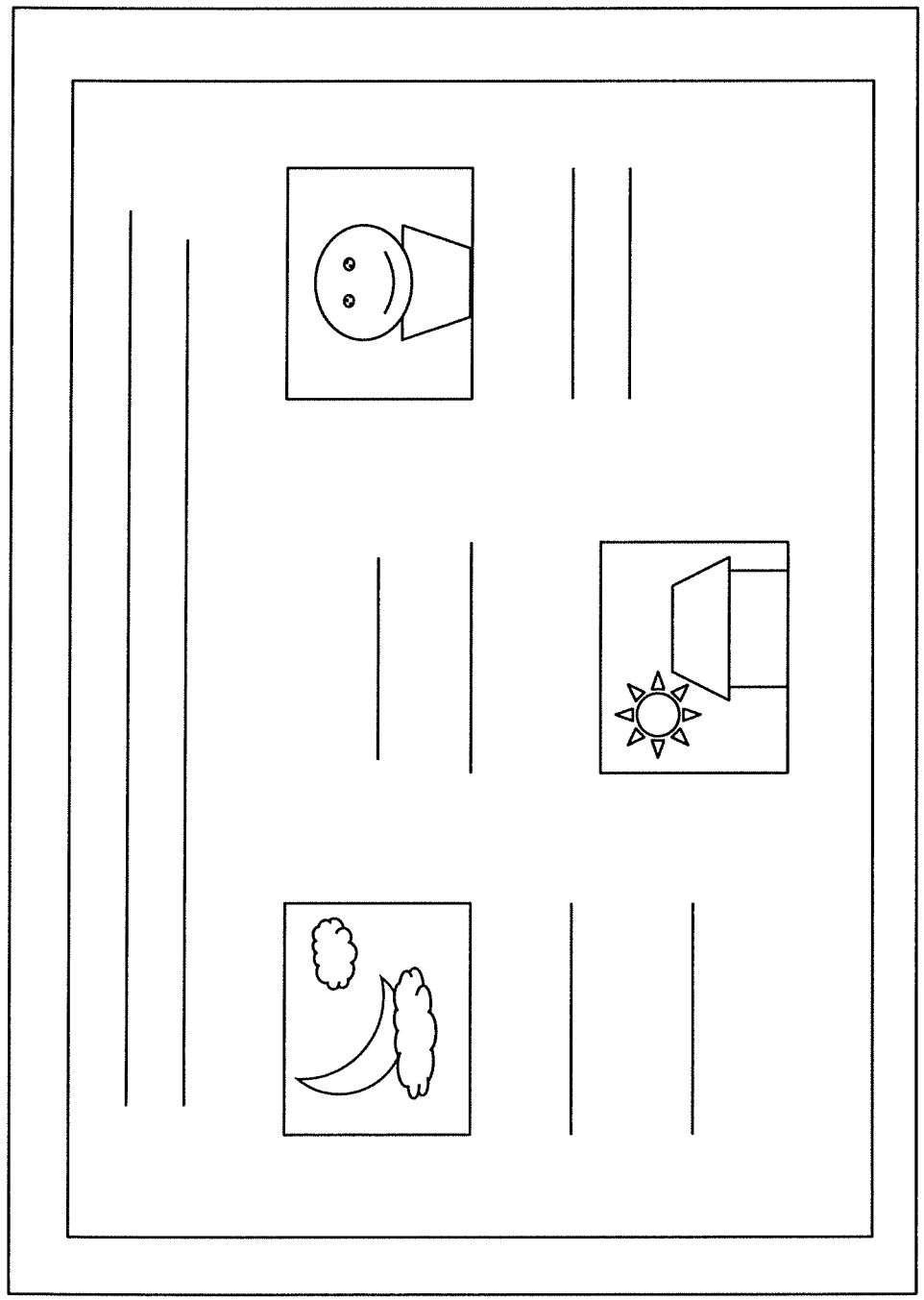
FIG. 13 illustrates an example of a display screen of a web page.
Figure 14:
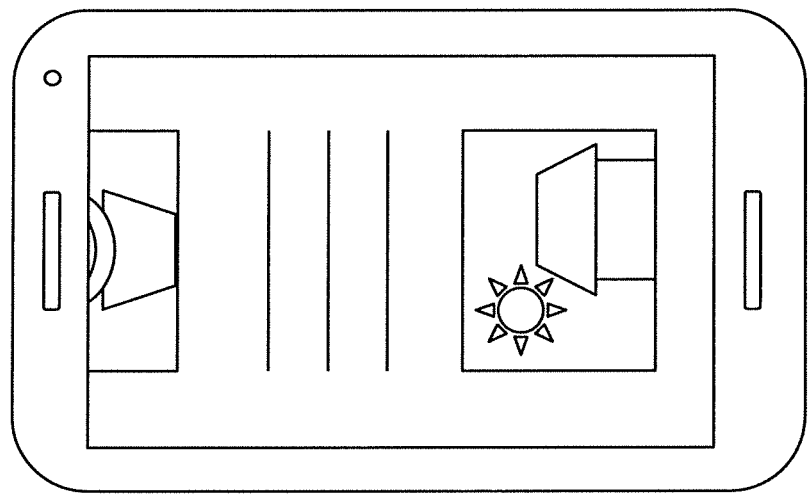
FIG. 14 illustrates an example of a display screen of a web page.

FIG. 13 illustrates an example of a display screen of a web page on, for example, computer ex111. FIG. 14 illustrates an example of a display screen of a web page on, for example, smartphone ex115. As illustrated in FIG. 13 and FIG. 14, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 15:
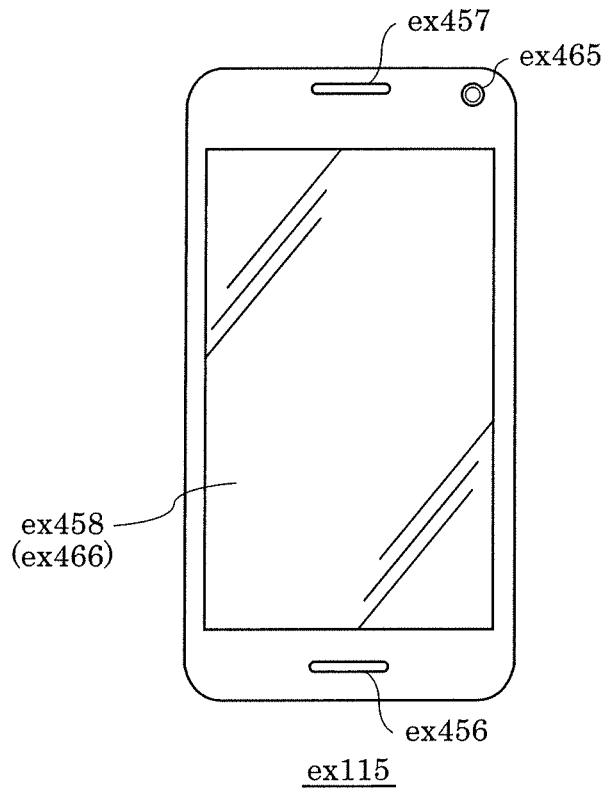
FIG. 15 illustrates one example of a smartphone.
Figure 16:
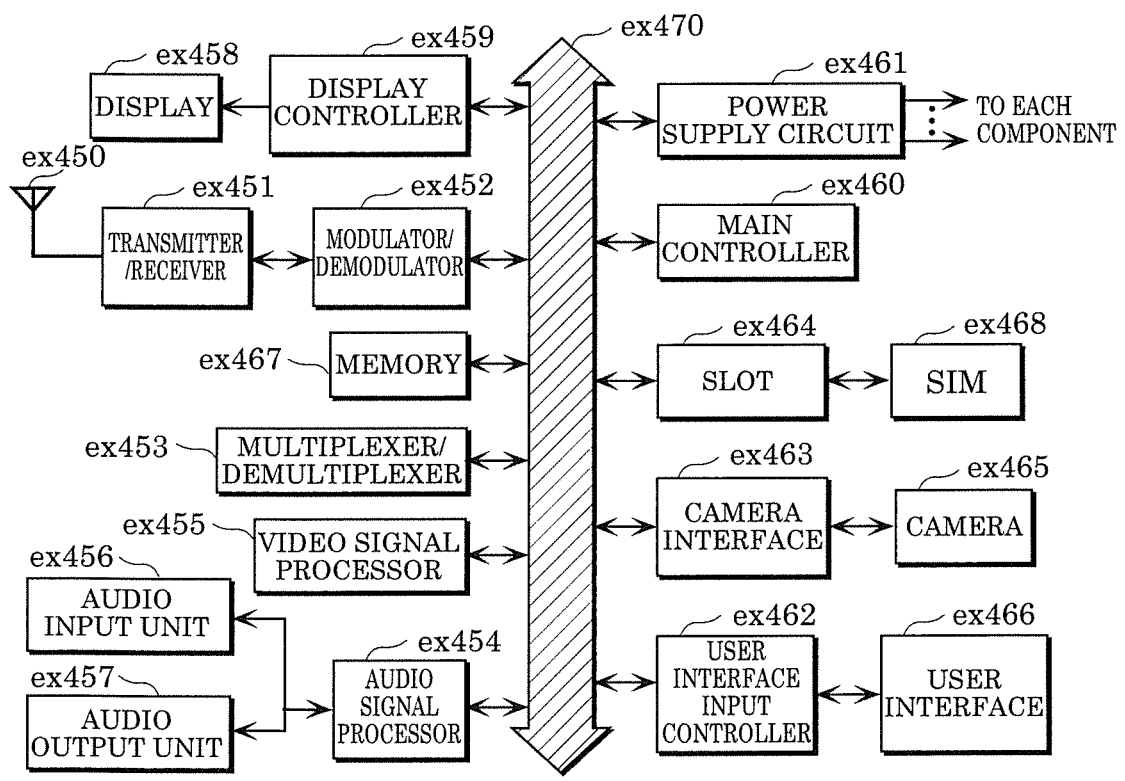
FIG. 16 is a block diagram illustrating a configuration example of a smartphone.

FIG. 15 illustrates smartphone ex115. FIG. 16 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

What is claimed is:

1. An image processor, comprising:
   memory; and
   circuitry accessible to the memory,
   wherein the circuitry accessible to the memory performs processing of approximating a decompressed image to an original image by using a neural network model trained to approximate the decompressed image to the original image, the decompressed image being obtained as a result of compression of the original image and decompression of the compressed image,
   the neural network model includes one or more convolutional blocks, and includes one or more residual blocks,
   each of the one or more convolutional blocks is a processing block including a convolutional layer, and
   each of the one or more residual blocks includes a convolutional group including at least one of the one or more convolutional blocks, inputs data which is input to the residual block to the convolutional group included in the residual block, and adds the data input to the residual block to data to be output from the convolutional group.

2. The image processor according to claim 1,
   wherein the one or more convolutional blocks are two or more convolutional blocks.

3. The image processor according to claim 2,
   wherein the one or more residual blocks are two or more residual blocks.

4. The image processor according to claim 2,
   wherein the convolutional group included in each of the one or more residual blocks includes at least two of the two or more convolutional blocks.

5. The image processor according to claim 1,
   wherein the one or more convolutional blocks are three or more convolutional blocks,
   the one or more residual blocks are included in a residual group, and includes at least one convolutional block among the three or more convolutional blocks,
   at least one convolutional block which is included in the three or more convolutional blocks and is not included in the residual group is included in a first convolutional group,
   at least one convolutional block which is included in the three or more convolutional blocks and is included neither in the residual group nor in the first convolutional group is included in a second convolutional group,
   data which is output from the first convolutional group is input to the residual group, and
   data which is output from the residual group is input to the second convolutional group.

6. The image processor according to claim 1,
   wherein the neural network model includes a processing group which includes the one or more convolutional blocks and the one or more residual blocks, and data which is input to the neural network model is input to the processing group, the data which is input to the neural network model is added to data which is output from the processing group, and a result of the addition is output from the neural network model.

7. An image processing method, comprising:

performs processing of approximating a decompressed image to an original image by using a neural network model trained to approximate the decompressed image to the original image, the decompressed image being obtained as a result of compression of the original image and decompression of the compressed image, wherein the neural network model includes one or more convolutional blocks, and includes one or more residual blocks, each of the one or more convolutional blocks is a processing block including a convolutional layer, and each of the one or more residual blocks includes a convolutional group including at least one of the one or more convolutional blocks, inputs data which is input to the residual block to the convolutional group included in the residual block, and adds the data input to the residual block to data to be output from the convolutional group.

* * * * *